(12) United States Patent
Prohl et al.

(10) Patent No.: US 7,392,993 B1
(45) Date of Patent: Jul. 1, 2008

(54) CONTAINER FOR STORING, SECURING AND TRANSPORTING ARTICLES

(75) Inventors: Richard Prohl, Westerville, OH (US); Michael Hacket, Columbus, OH (US); John Fike, New Albany, OH (US)

(73) Assignee: SST Systems NFC, LLC, Westerville, OH (US)

( * ) Notice: Subject to any disclaimer, the term of this patent is extended or adjusted under 35 U.S.C. 154(b) by 192 days.

(21) Appl. No.: 11/338,050

(22) Filed: Jan. 24, 2006

Related U.S. Application Data

(60) Provisional application No. 60/646,352, filed on Jan. 24, 2005.

(51) Int. Cl.
*B62D 39/00* (2006.01)

(52) U.S. Cl. .................. 280/33.998; 280/79.3; 280/639

(58) Field of Classification Search ............ 280/33.998, 280/33.993, 33.996, 651, 639, 79.3, 79.11
See application file for complete search history.

(56) References Cited

U.S. PATENT DOCUMENTS

| | | | | |
|---|---|---|---|---|
| 1,912,847 A | * | 6/1933 | Klepel | 280/33.998 |
| 2,905,480 A | | 9/1959 | Giovannelli | |
| 3,007,708 A | * | 11/1961 | Ochs | 280/33.998 |
| 3,372,829 A | * | 3/1968 | Averill | 220/6 |
| 3,628,805 A | * | 12/1971 | Archer | 280/33.998 |
| 3,666,105 A | | 5/1972 | Fox, Jr. | |
| 3,904,853 A | | 9/1975 | Shoup et al. | |
| 3,953,047 A | * | 4/1976 | Morgan | 280/639 |
| 4,118,048 A | | 10/1978 | Spranger et al. | |
| 4,222,579 A | * | 9/1980 | Frydendal | 280/33.996 |
| 4,275,665 A | * | 6/1981 | Silverman | 280/79.3 |
| 4,377,367 A | | 3/1983 | Smith | |
| 4,846,485 A | | 7/1989 | Payne | |
| 5,190,302 A | | 3/1993 | Trotta | |
| 5,275,365 A | | 1/1994 | Gerbel et al. | |
| 5,294,137 A | | 3/1994 | Barber et al. | |
| 5,348,324 A | | 9/1994 | Trotta | |
| 5,350,066 A | | 9/1994 | Mendoza et al. | |
| 5,640,002 A | * | 6/1997 | Ruppert et al. | 235/462.46 |
| 5,690,217 A | | 11/1997 | Friday | |
| 5,906,381 A | | 5/1999 | Hovatter | |
| 6,047,976 A | | 4/2000 | Wang | |

(Continued)

FOREIGN PATENT DOCUMENTS

FR 2550150 A * 2/1985

*Primary Examiner*—Hau V Phan
(74) *Attorney, Agent, or Firm*—James R. Eley; Michael A. Forhan; Eley Law Firm Co.

(57) ABSTRACT

A container for storing, securing and transporting articles. The container comprises a plurality of members having predetermined lengths. A plurality of connectors interconnect the members to space apart and arrange the members generally vertically and horizontally to form a boxlike shape. A selectably securable closure is hingedly coupled to a first sidewall of the container. A pair of wheels are attached to a first edge of a bottom of the container, and a pair of legs attached to a second, opposing edge of the bottom of the container. The container may be stored in either a generally vertical orientation or a generally horizontal orientation. The container may also be pivoted about the wheels to transport the container. In addition, the container may be stacked with other containers when in the horizontal orientation.

21 Claims, 17 Drawing Sheets

U.S. PATENT DOCUMENTS

| | | |
|---|---|---|
| 6,170,839 B1 | 1/2001 | Kizewski |
| 6,398,235 B1 | 6/2002 | Cary |
| 6,502,656 B2 | 1/2003 | Weiss et al. |
| 6,520,514 B2 | 2/2003 | Clegg |
| 6,520,515 B2 | 2/2003 | Krawczyk |
| 6,663,139 B1 * | 12/2003 | Smith ........................ 280/651 |
| 6,758,482 B2 | 7/2004 | Stallbaumer |
| 6,988,079 B1 * | 1/2006 | Or-Bach et al. ............... 705/28 |

* cited by examiner

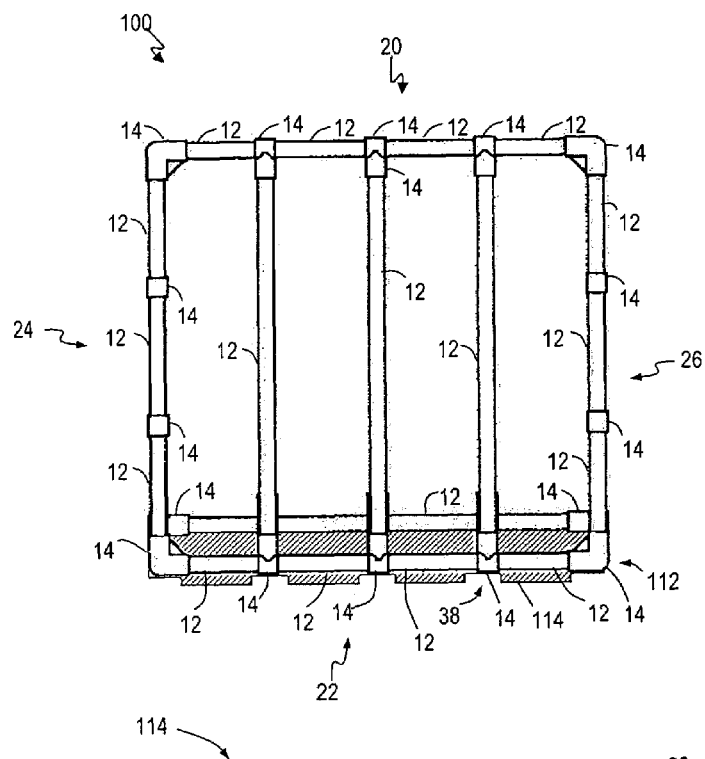
Fig. 12
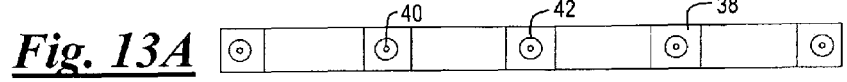
Fig. 13A
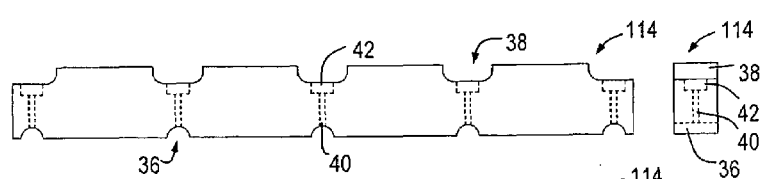
Fig. 13B
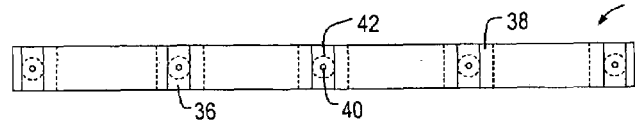
Fig. 13D
Fig. 13C

CONTAINER FOR STORING, SECURING AND TRANSPORTING ARTICLES

This application claims priority to U.S. Provisional Pat. App. No. 60/646,352, filed Jan. 24, 2005, the contents of which are hereby incorporated by reference.

FIELD OF THE INVENTION

The present invention relates generally to storage containers. In particular, the present invention relates to a secure storage and transport container for voting equipment.

BACKGROUND

Voting for candidates for public office in the United States is largely carried out by use of portable voting machines of various types, including mechanical, optical and electronic machines. The machines are kept in a storage location until needed, then transported to various polling places within a voting district shortly before election day. Many of the voting machines available in the art are adapted to fit into a transport case, such as a suitcase-sized container or a protective, wheeled chassis. Some voting machines have even been integrated directly into collapsible polling booths.

Although the cases for voting machines fulfill their intended function of protecting a voting machine and its ancillary components, a problem arises with storing a plurality of voting machines. Election officials are faced with the task of collecting the voting machines and organizing them in a logical fashion to ensure that they are all accounted for while in storage. Inevitably, some voting machines are temporarily misplaced or are lost altogether. Officials must also ensure that the machines are not stolen or tampered with, as such activities may call into question the validity of the polling results.

An additional problem arises when the voting machines are taken out of storage and distributed to the various polling places. The machines are often taken to public locations, such as libraries and schools, prior to election day so that the machines are readily available to the election workers responsible for setting up the polling stations. This necessitates that election officials rely on the facilities of the polling place to store and secure the voting machines prior to being set up. Consequently, the voting machines may be stored in a relatively unsecured location, such as an office or storage room, leaving them susceptible to theft and tampering.

Transporting voting machines from the storage location to the various polling places is also problematic, as the machines must be individually loaded, transported and unloaded, requiring a significant amount of labor. There is also a risk that some of the cases will be inadvertently lost or delivered to the wrong polling place, hampering the voting process by leaving some polling places with fewer voting booths than are needed. There is a need for a more efficient and effective way to store, secure and transport voting machines.

SUMMARY

The disclosed invention is a portable container for storing, securing and transporting voting machines and ancillary equipment. The container is securable with a lock or other device and holds a plurality of voting stations. The container may be made of spaced-apart tubing to provide access for charging, inventorying and access to data ports of the voting machines for downloading and clearing vote tallies. The container may be fitted with wheels to allow it to be easily moved by a single user without assistance.

When the container is used for storage it may be moved by a forklift, whose tines may engage spaces between the runners and lift the container from its base. The runners may also include appropriately-spaced notches corresponding to the shape and spacing of the tubing of an adjacent container. The runners may thereby assist in stacking the containers by engaging the tubing that forms a side, top or bottom of a vertically adjacent container. When so stacked, access doors of the containers may remain accessible such that equipment stored within may be removed, even while in storage or may be obstructed to provide added security.

An aspect of the present invention is a container for storing, securing and transporting articles. The container comprises a plurality of members having predetermined lengths. A plurality of connectors interconnect the members to space apart and arrange the members generally vertically and horizontally to form a boxlike shape. A selectably securable closure is hingedly coupled to a first sidewall of the container. A pair of wheels are attached to a first edge of a bottom of the container, and a pair of legs attached to a second, opposing edge of the bottom of the container. One or more articles may be inserted into the container through the closure for storage. The container may be stored in both a generally vertical orientation, resting upon the wheels and legs, and a generally horizontal orientation, resting upon the runners. The container may also be pivoted about the wheels to transport the container. In addition, the container may be stacked with other containers when in the horizontal orientation.

Another aspect of the present invention is a method for storing, securing and transporting articles. The method comprises the steps of obtaining a plurality of members having predetermined lengths and interconnecting the members generally vertically and horizontally to form a boxlike shape. A closure is hingedly coupled to a first sidewall of the container. A pair of wheels are attached to a first edge of a bottom of the container. A pair of legs are attached to a second, opposing edge of the bottom of the container. One or more articles may be inserted into the container through the closure for storage. In addition, the container may be stored in both a generally vertical orientation, resting upon the wheels and legs, and a generally horizontal orientation, resting upon the runners. Further, the container may be pivoted about the wheels to transport the container. The container may also be stacked with other containers when in the horizontal orientation.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 12 is a top plan view of the container of FIG. 9;

FIG. 13A is a bottom plan view of a runner according to an embodiment of the present invention;

FIG. 13B is a side elevational view of the runner of FIG. 13A;

FIG. 13C is an end elevational view of the runner of FIG. 13A;

FIG. 13D is a top plan view of the runner of FIG. 13A;

FIG. 16A is a side elevational view of a table according to an embodiment of the present invention;

FIG. 16B is a front elevational view of the table of FIG. 16A;

DETAILED DESCRIPTION

Figure 1:
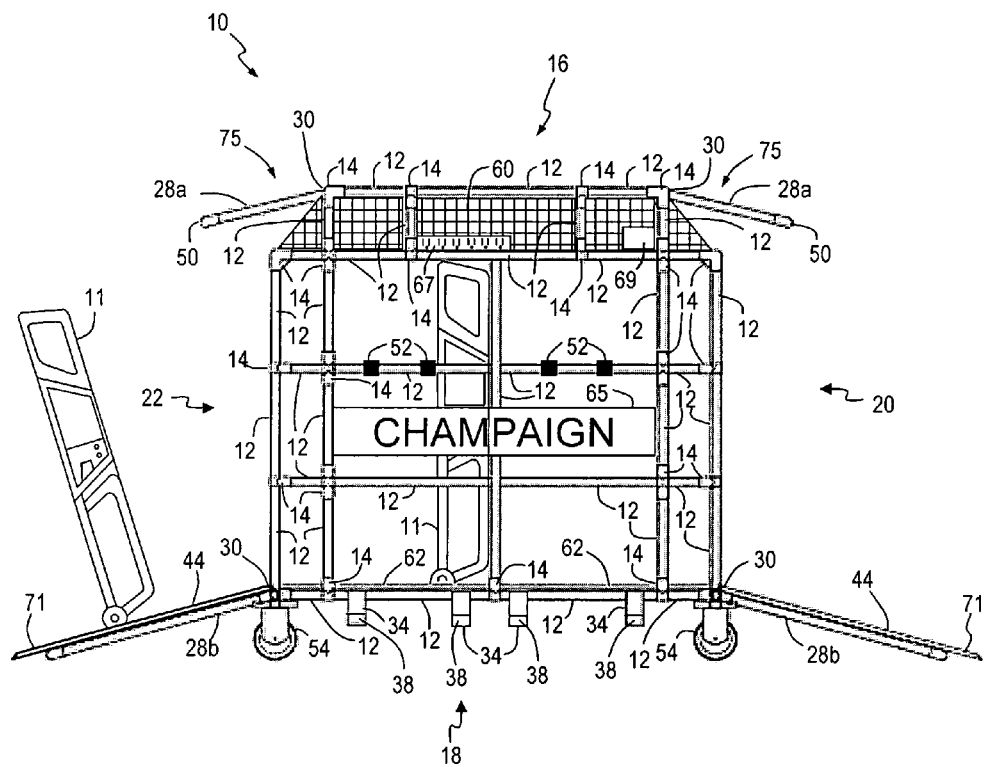
FIG. 1 is a left side elevational view of a container according to an embodiment of the present invention.

Several embodiments of the present invention are described below with reference to the figures, in which like reference numerals refer to like elements in the various views.

Figure 2:
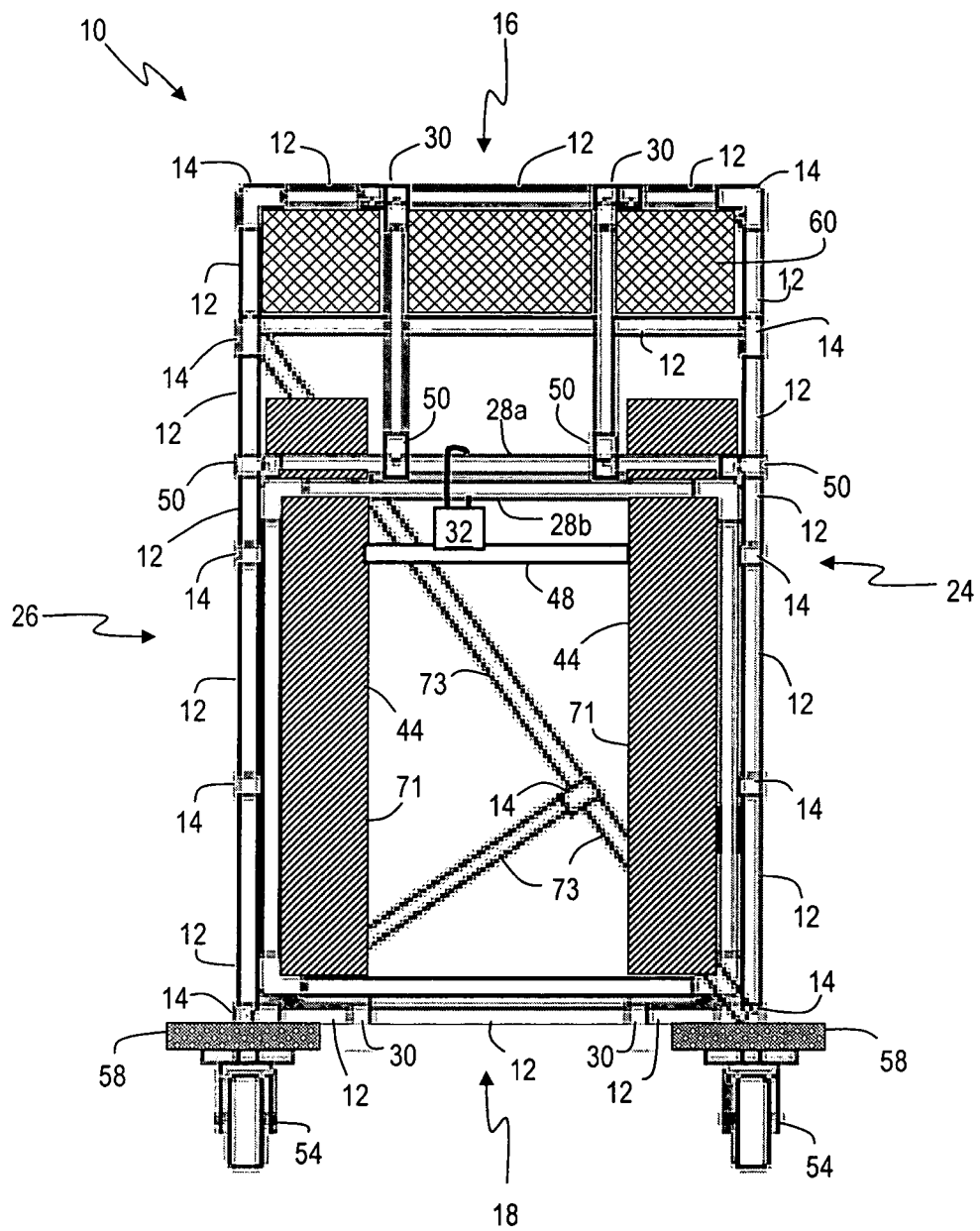
FIG. 2 is a front side elevational view of the container of FIG. 1.
Figure 3:
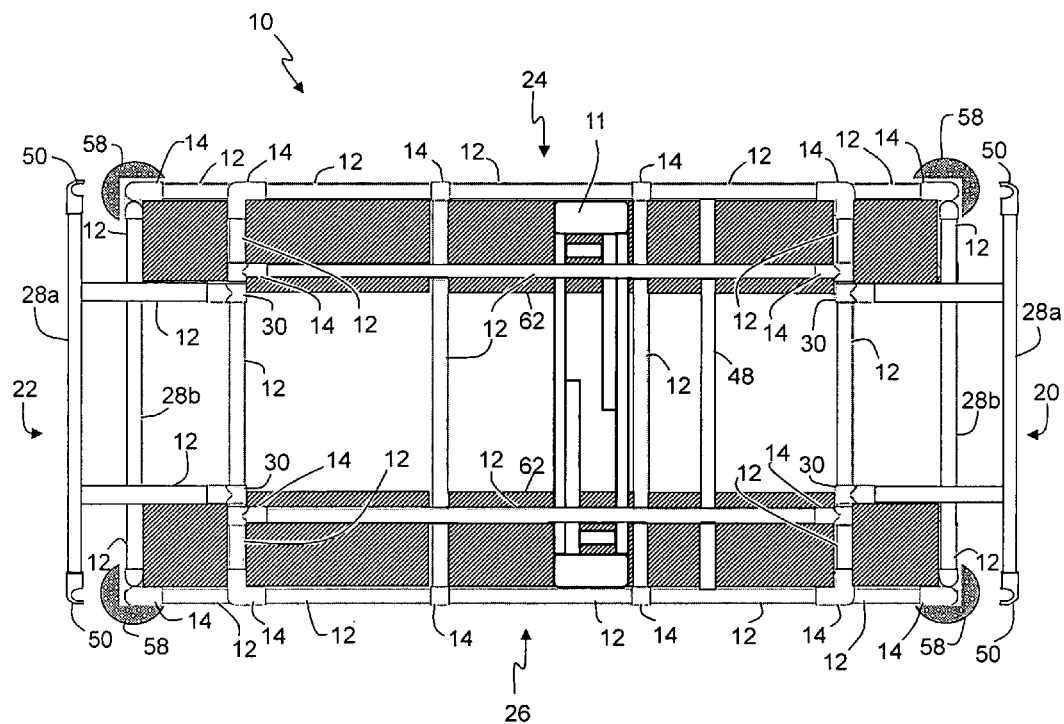
FIG. 3 is a top plan view of the container of FIG. 1 with upper doors in their opened positions.

A container 10 for storing, securing and transporting voting equipment is depicted in FIGS. 1, 2 and 3 according to an embodiment of the present invention. Container 10 is constructed of an array of tubing sections 12 interconnected by connectors 14 and spaced apart by a plurality of like tubing sections, forming a generally box-shaped geometry having top 16, bottom 18, front sidewall 20, rear sidewall 22, left sidewall 24 and right sidewall 26, all forming generally planar sides.

Tubing sections 12 may be of any lengths suitable for forming the desired shape and size of container 10. Generally tubing sections 12 may be cut to two different lengths, but multiple lengths or a single length may also be used. The longer lengths may be used to form the vertical portions of the sidewalls of container 10 and the shorter lengths used to form the horizontal portions, or vice versa. Such an arrangement may provide a grid-like structure for the sides of container 10 that contains adequate open space for allowing access to the contents of the container while also providing adequate obstruction to removal of the container's contents. Various lengths and assortments of tubing sections 12 may be employed to further shape the sides of container 10 and to provide greater or lesser access to the container's contents. The number and length of tubing sections 12 may also be varied as required for structural considerations, such as strength or rigidity necessary for the container to hold a given load, among others.

Tubing sections 12 may be made of any material suitable for bearing the load of stored voting equipment 11, associated hardware and that of other containers 10 and their contents that may be stacked on top of the container as is described below. Example materials include wood, plastics, composites and metals such as steel or aluminum, among others. The materials may be vinyl-coated, powder-coated, anodized or painted, among other methods, to impart color and surface qualities to the appearance of tubing sections 12 and to provide protection for those sections from the environment. Tubing sections 12 may be produced from solid bar stock or from tubing. Further, tubing sections 12 may have any cross-sectional shape that is compatible with connectors 14 and other components of container 10.

Connectors 14 may generally have a plurality of open, hollow ends into which ends of tubing sections 12 may be inserted and fixedly retained, but other connector types and styles may also be employed. Connectors 14 of the present embodiment generally resemble conventional pipe fittings for coupling together two or more pipes in orientations such as abutting, at 90° angles or at other suitable angles, among others. Tubing sections 12 may be retained within connectors 14 by a compression fit between the two elements or may in addition, or alternatively, utilize glues, adhesives, welding, screws or nuts and bolts, among other fixtures and retention methods. Connectors 14 may be made of any suitable plastic, composite or metal material that provides the strength, durability and compatibility with tubing sections 12 necessary to support the loads placed on container 10.

As depicted in FIGS. 1, 2 and 3, one or more of top 16, bottom 18 or sidewalls 20, 22, 24, 26 may include a set of doors 28a, 28b which may be constructed from tubing sections 12 and connectors 14 and mounted to container 10 with one or more hinges 30. Doors 28a, 28b may be constructed in any suitable size or shape compatible with container 10. Doors 28a, 28b may be constructed in a manner similar to that used for constructing container 10 or may utilize another method or material, such as a one-piece formed, molded or machined door.

Doors 28a, 28b may be selectably closed and secured to prevent removal of the contents of container 10. Doors 28a, 28b may be secured by any conventional means including, without limitation, latches, clamps, locks, u-locks, pad-locks, dead bolts, cable ties, tamper-resistant seals, tapes, fasteners, cables and chains, hereinafter generally referred to as lock 32. If a lock 32 is used, the lock may be a separate piece, such as a keyed or combination padlock 32 as depicted in FIG. 2. Lock 32 may optionally be made an integral part of doors 28a, 28b and a sidewall of container 10. Mating connectors 50 (described further below) may also be utilized to retain doors 28a, 28b in the closed position.

Doors 28a, 28b may be attached along any sidewall 20, 22, 24 or 26, top 16 or bottom 18 of container 10. Further, doors 28a, 28b may comprise a single section or multiple sections such as sections 28a and 28b and the section or sections may be hinged along a sidewall or bottom 18 or top 16 edge of container 10 with one or more hinges 30, as shown in FIGS. 1, 2 and 3. Where multiple door 28 sections are employed they may be hinged along a common edge of container 10 to provide multiple adjacent openings in the side or top of the container or the door sections may be hinged along opposing or adjacent edges of the container. The door 28 sections may overlap to allow greater security and ease of locking or securing. Doors 28a, 28b may also be removably mounted to container 10 which may allow easier access to the contents of the container when opened.

Hinges 30 may be of any suitable design that may provide the security, strength and durability necessary for container's 10 application. Where container 10 is constructed of round bar or tube, hinges 30 may generally comprise fittings that rotatably attach around tubing sections 12 to allow doors 28a, 28b to pivot about the attached tubing section, among other hinge types and designs.

Figure 4A:
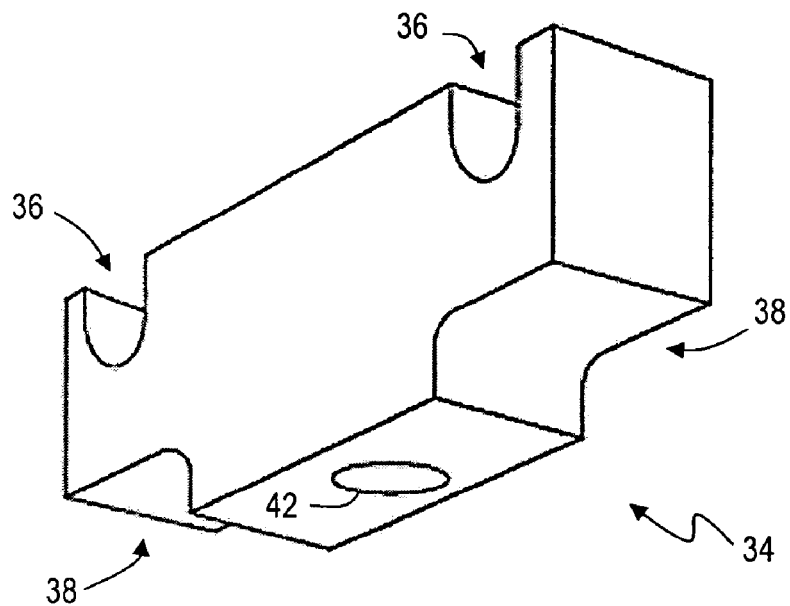
FIG. 4A is a perspective view of a runner for a container according to an embodiment of the present invention.
Figure 4B:
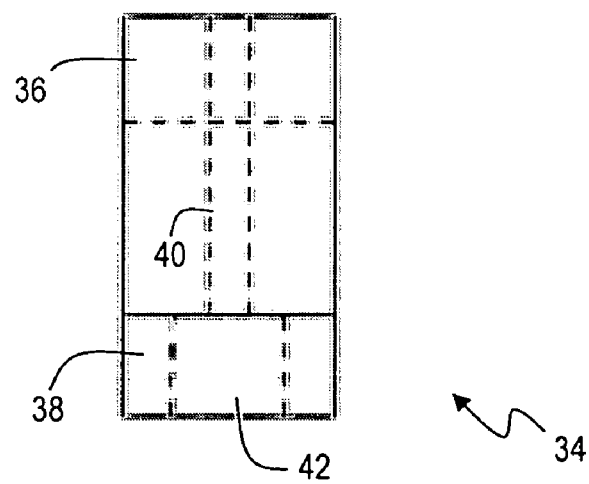
FIG. 4B is a side elevational end view of the runner of FIG. 4A.

With reference to FIGS. 4A and 4B, and continued reference to FIG. 1, container 10 may include runners 34 according to an embodiment of the present invention. Two or more runners 34 may be affixed to a sidewall 20, 22, 24, or 26, bottom 18, or top 16 of container 10. The location of runners 34 may be chosen based on whether an embodiment of container 10 is designed to be stacked in the container's vertical or horizontal position, as discussed in greater detail below. If the container 10 is to be stacked in a generally vertical orientation runners 34 may generally be attached to the bottom 18 and/or top 16 of the container. If container 10 is to be stacked in a generally horizontal orientation runners 34 may be attached to a sidewall 20, 22, 24 or 26 of the container. Embodiments where a container 10 may be stacked in either position and would therefore require runners 34 on both a side 20, 22, 24, 26 and the top 16 or bottom 18 may also be utilized.

Figure 5:
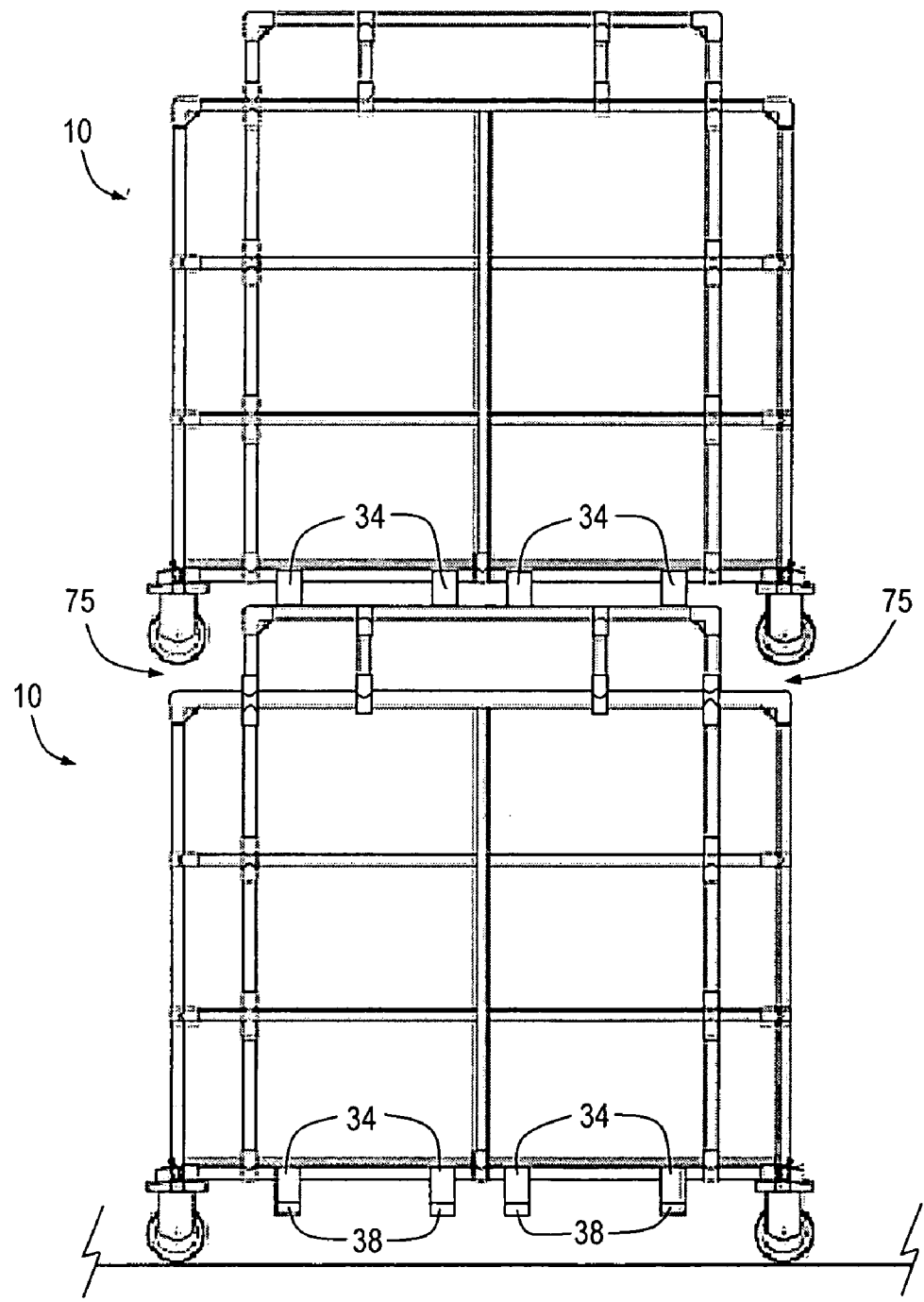
FIG. 5 shows a second container stacked upon a first container according to an embodiment of the present invention.

Each runner 34 includes a plurality of generally semicircular cavities 36 on a first side, the cavities being shaped to couple to tubing sections 12 of the appropriate side of container 10 as shown in FIGS. 4A and 4B. An opposing second side of runner 34 includes a plurality of notches 38 shaped to allow the insertion of tubing sections 12 of adjacent containers 10 when the containers are stacked, as shown in FIG. 5. An opening 40 extends between each opposing indentation 36 and notch 38 to facilitate mounting of the runner 34 to container 10 with mounting hardware such as screws and bolts (not shown). Opening 40 may include a countersink portion 42 to prevent interference between the mounting hardware and the vertically adjacent container 10 in a stack. Runners 34 may have any suitable dimensions but generally have a thickness of about 3 to about 4 inches, or otherwise of sufficient height to allow insertion of forklift tines between container 10 and the ground or another container. The length and width may be varied to accommodate a given embodiment of container 10 but may generally be about 4 inches wide and about 1 foot in length. Runner 34 may be made from any suitable material including, without limitation, wood, metal and plastic such as high-density polyethylene.

Some embodiments of container 10 may include one or more ramps 44, as shown in FIGS. 1 and 2. In various embodiments ramp 44 may be permanently or detachably hingedly attached proximate door 28b such that the ramp pivots downwardly from the region of the door and extends to the ground. In other embodiments door 28b may be appropriately hinged and constructed to serve as a ramp 44 when in an open position. In still other embodiments the ramp may be stored within container 10 and pulled or pivoted to a deployed position when needed. One or more traction portions (not shown) may be made part of or attached to ramp 44. Example traction portions include, but are not limited to, ridges, attached textured surfaces and tread strips. Ramp 44 may be a single piece of material covering the entire ramp surface or may utilize separate structural pieces of material such as channels to form tracks along which wheeled objects may be rolled. Ramp 44 may also be reinforced by added tubing sections 12 or other fixtures and features to the ramp's structure. Where necessary hydraulic, pneumatic, tension or other devices may be coupled to container 10 and ramp 44 to assist in raising and lowering the ramp.

Ramp 44 may be incorporated into door 28b or incorporated into container 10 separate from door 28b. In either instance, ramp 44 may be positioned between the bottom edge of the door 28b opening and the ground to allow wheeled voting units or other devices to be rolled into and out of container 10. After loading or unloading of container 10 is complete ramp 44 may be raised, removed or otherwise repositioned into a storage position and door 28b closed and secured.

Ramps 44 may comprise a plurality of structural channels 71 secured to hinged door 28. In the alternative, ramp 44 may be made from any suitable generally planar material, such as metal, wood or plastic, of a suitable size, toughness and strength for compatibility with door 28b and the items to be stored in container 10.

Figure 6:
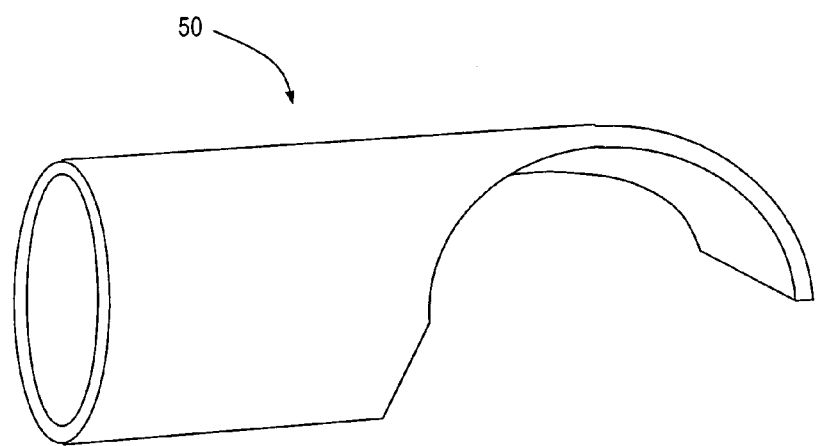
FIG. 6 depicts a mating connector according to an embodiment of the present invention.

Container 10 may also include dividers, shelves, slots, guides or biased members, hereinafter referred to as dividers 48, attached to at least one of sidewalls 20, 22, 24, 26, top 16 or bottom 18 that can be employed as spacers to keep stored cargo from shifting in the event that less than the entire cavity formed by the container is filled, as shown in FIGS. 2 and 3. Dividers 48 may comprise sections of tubing such as that employed in the construction of container 10 with the addition of mating connectors 50 attached to each end and having sufficient length to allow the divider to connect across a portion of the interior of the container. In one embodiment the mating connectors 50 may be similar to connectors 14 used in the construction of container 10 having a first portion which permanently and fixedly connects to dividers 48 and a second portion, oriented generally perpendicularly to the first portion and being generally C-shaped, as shown in FIG. 6. The C-shape may allow the mating connector 50 to be clamped around the circumference of tubing sections 12 of container 10 tightly enough to retain divider 48 in position while still allowing the divider to be disconnected or repositioned within the container. In addition, divider stops 52, as shown in FIG. 1, may be located along the length of the tubing sections 12 to which dividers 48 may connect in order to prevent the dividers from sliding along the tubing sections. Divider stops 52 may comprise rubber washers, plastic or metal rings or clamps or other fixtures permanently or temporarily affixed along the length of tubing sections 12.

Dividers 48 may also connect to tubing sections 12 by utilizing fixtures such as clips, pegs, clamps, screws or other temporary or permanent fittings. Tubing sections 12 may be modified by adding notches, apertures or other features that may interact with the fixtures of dividers 48 and thereby provide adequate connection of the dividers to the tubing sections.

In some embodiments dividers 48 may also be made permanent to provide separation between sections within container 10. Such permanent dividers 48 may utilize connectors 14 and tubing sections 12 to connect between opposing sidewalls of container 10 in much the way a cross-member may connect. Permanent dividers 48 may also provide support for container's 10 structure and thereby substantially serve as cross-members for the container.

Wheels 54 may be added to the base of container 10 to allow movement of the container by one or more users. In various embodiments four wheels 54 may be mounted, generally with one at or near each corner along the bottom 18 of container 10, as shown in FIGS. 1 and 2. In other embodiments the size, weight and or shape of container 10 may dictate the use of more than four wheels. In another embodiment, a single pair of wheels mounted along a bottom edge of container 10 may allow a user to pivot the container about the wheels and move the container in a manner much like that of a dolly, similar to the embodiment shown in FIGS. 9 and 10. In such an embodiment one or more legs are mounted along an opposing edge of the bottom of container 10 to allow the container to rest levelly when not being moved.

The wheels may be fixed direction or free-castering type and may additionally have locking or braking mechanism as well as height adjustment mechanisms. The wheels may further include bumpers 58, shown in FIGS. 2 and 3, which extend from container 10 and may protect the container as well as other structures and objects from detrimental contact during movement of the container. Bumpers 58 may be made of rubber, plastic or any other suitable material, may be mounted at any suitable point along container 10 and may employ any suitable shape or structure.

Container 10 may optionally include one or more accessory compartments 60 in an upper portion of the container, as shown in FIGS. 1 and 2, to protect and store ancillary equipment such as printers, cables and voting supplies and support materials. The accessory compartment 60 may be either temporarily or permanently attached to one or more of sidewalls 20, 22, 24, 26, top 16 or bottom 18. Accessory compartment 60 may be shaped to fit between articles stored inside container 10 and one or more sides of the container, and may be made from a rigid, semi-rigid or flexible material such as corrugated plastic board, cardboard, ballistic fabric or metal sheet among others. Accessory compartment 60 may also include or be made of static-dissipative or anti-static materials, such as anti-static foam, to protect electronic equipment stored therein from damage due to electro-static discharge ("ESD"). In one embodiment accessory compartment 60 is constructed from corrugated plastic sheet folded and cut to shape, and anchored to container 10 by tabs extending from connectors 14 that are inserted into slots cut in the accessory compartment. Accessory compartment 60 may also be made to be separately lockable and/or waterproof.

As shown in FIGS. 1 and 2, in various embodiments of the present invention one or more of sidewalls 20, 22, 24, 26, bottom 18 or top 16 may include a generally planar deck 62 made of any suitable material, such as metal, wood, fiberglass or plastic, among others. Deck 62 may be temporarily or permanently mounted to container 10 and may provide a solid surface for items stored in container 10. For example, deck 62 may be attached to the interior of bottom side 18, as shown in FIG. 1, to provide a solid surface to facilitate loading and unloading voting equipment such as an Optical Scan Machine ("OSM") that typically has wheels or casters on a bottom side such that it can be easily moved. As shown in FIGS. 2 and 3 deck portions 62 comprise structural shapes corresponding to ramp sections 71, but could comprise a sheet spanning the entire bottom 18 of container 10, as well.

Figure 7:
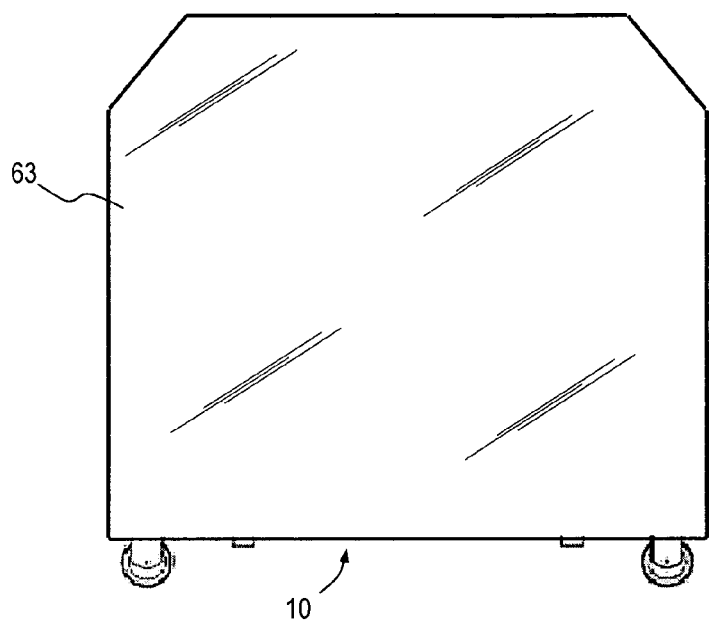
FIG. 7 shows an optional cover according to an embodiment of the present invention.
Figure 8:
FIG. 8 shows a view in section of a ramp according to an embodiment of the present invention.

Container 10 may include an exterior cover 63 as depicted in FIG. 7, shaped to fit over at least a portion of sides 20, 22, 24 and 26 and top 16. Cover 63 may be used to protect voting equipment 11 inside container 10 from the elements during transport, keep dust off the voting equipment while in storage, and add to the security of the voting equipment by shielding them from view and ready access. Cover 63 may be made from any conventional cloth, fabric or plastic material.

Container 10 may optionally include a permanent or replaceable nameplate 65 as shown in FIG. 1, the nameplate having information relating to the voting equipment 11 stored in the container. For example, nameplate 65 may indicate the name of a voting district, such as a county, and/or a polling location within the district and the identity of voting equipment 11 assigned to a specific container 10.

In other embodiments container 10 may include electrical power outlets such as power strips 67, depicted in FIG. 1, so the voting equipment 11 can be charged in situ (not shown). In other optional embodiments ancillary equipment 69, such as data ports, GPS equipment and RFID tags, may be added to container 10 as shown in FIG. 1 to facilitate data transfer, inventory and tracking of containers and equipment stored therein.

Container 10 may be molded and/or finished in any desired color or combination of colors. For example, container 10 may be finished in red, white and blue representative of the American flag. The colors may be molded into the parts, plated on, or painted, depending upon the types of materials used to construct container 10.

In various embodiments the size and shape of container 10 may be varied by adding or subtracting tubing sections 12 and connectors 14, and by varying the spacing between tubing sections. The size and shape of container 10 may thus be tailored to house any particular sizes and/or quantities of articles to be stored therein.

Referring again to FIGS. 1-4, one embodiment of the present invention may be constructed such that eight direct recording electronic (DRE) voting machines that have been incorporated into rolling chassis, such as the iVotronic™ voting machine produced by Election Systems & Software, may be secured, stored and transported in a container 10. Container 10 may be constructed as depicted in FIG. 1 and may be supplied with ramps 44 at each end 20 and 22, wheels 54 at each corner of the base and accessory box 60 installed within an upper portion of the container. Ramps 44 at each end 20 and 22 of container 10 also form a portion of doors 28b and may be pivoted about the bottom 18 of the container to move from a generally vertical closed position to a sloping position between the ground surface and the bottom 18 of the container. Ramps 44 comprise two separate generally U-shaped metal channels 71 attached to a common frame 28b to provide a track on either side of the frame upon which the wheels of the DRE voting machines may roll, as depicted in FIGS. 1 and 2. Additional metal channels are attached along the interior of bottom 18 of container 10 to extend the tracks along the length of the container and to form deck 62. The DRE units may be rolled up ramp 44 along the tracks and into container 10. Ramp 44 may then be lifted to pivot it about hinges 30 along the bottom 18 edge of container 10. A second portion of door, numbered 28a in the figures, is hinged about an edge of top 16 of container 10 may then be pivoted about its hinges 30 to extend downward overlapping the upper edge of ramp 44 and engage mating connectors 50 to tubing sections 12 along the edge of sides 24 and 26 of container 10. A lock 32 or other fastening device may be placed around a cross-member of ramp 44 and a cross-member of door 28a and/or door 28b as shown in FIG. 2 to secure the voting units within the container. The same process and features may be followed for the opposing end of container 10 with reference to ramp 44 (FIG. 1). By this design, container 10 provides safe and secure storage of the voting equipment 11 while also allowing visual confirmation and accountability of the voting equipment's presence and integrity and access to the voting equipment for charging or downloading data after the vote is complete.

In some embodiments of container 10 one or more braces 73 comprising tubing sections similar to tubing sections 12 may be attached across opposing sidewalls 20, 22, 24, 26 to provide additional structural support and to provide a divider between the opposite ends of the container as depicted in FIG.

2. Where less than eight DRE units are to be secured and stored within container 10 dividers 48 may be attached across the width of the container to section off unneeded storage space, as seen in FIGS. 2 and 3.

Container 10 may be easily transported by rolling on its wheels 54 and may be locked in place by engaging a conventional brake portion of each wheel, if so equipped. Containers 10 may also be moved and stacked by a conventional forklift. A plurality of runners 34, such as that depicted in FIGS. 1, 4A and 4B are attached along bottom 18 of container 10 to assist in stacking the containers.

Figure 9:
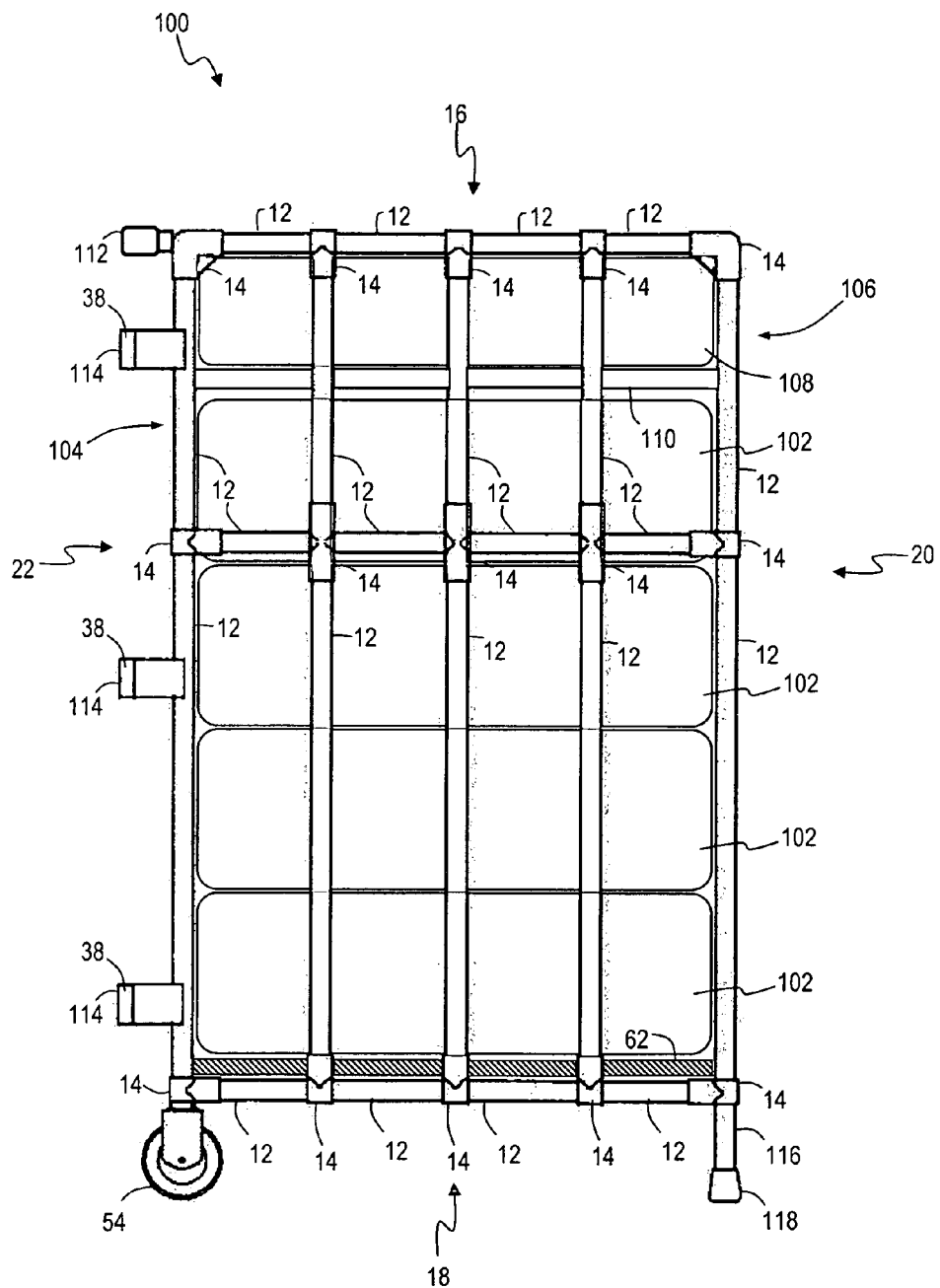
FIG. 9 is a right side elevation of a container according to an alternate embodiment of the present invention.

A plurality of containers 10 may be stacked vertically to provide greater storability in a warehouse or other storage facility, as shown in FIG. 5. Runners 34 may be appropriately spaced to allow the tines of a conventional forklift (not shown) to be inserted between and generally parallel to the runners when the runners are on the side nearest the ground. Container 10 may then be lifted and stacked atop another, similarly configured, container such that the tubing sections 12 of one container engage notches 38 of runners 34 of the vertically adjacent container, the wheels 54 of the upper container fitting into spaces 75 of the lower container. Runners 34 may thereby provide appropriate support for the upper container 10, and by engaging tubing sections 12 of the vertically adjacent container, may assist in retaining the containers in a vertical stack without sliding, shifting or turning of one container with respect to another. Generally, containers 10 may be stacked such that each container is oriented in the same direction, i.e., all of their front sides 20 facing in a single direction, but other orientations, such as where the containers are each rotated 90° with respect to vertically adjacent containers, may be utilized. Runners 34 further provide appropriate spacing between the vertically adjacent containers 10 and between the lowest container and the ground to allow insertion and withdrawal of the forklift tines.

Where runners 34 are attached along the bottom of container 10, as shown in FIG. 5, a plurality of containers may be stacked by simply placing one container atop another with a forklift, crane or other lifting apparatus (not shown). In addition, where runners 34 are placed along a side surface of container 10, such as depicted in FIG. 9 and referring to runners 114, the container may be tipped over and laid horizontally in a generally horizontal position on the side containing runners 34. Runners 34 thereby provide spacing between the ground and the side of container 10 to allow insertion of the forklift tines. A forklift, crane or other lifting apparatus may then lift and stack a plurality of containers 10 in this generally horizontal position. Stacking in the horizontal position may be beneficial where containers 10 are constructed such that they are taller than they are wide. In such instances, lying containers 10 horizontally before stacking may provide greater ease of stacking because the overall height of the stack may be less and thus provide greater stability.

FIRST ALTERNATE EMBODIMENT

Referring now to FIGS. 9-14, an alternate embodiment of the present invention is depicted in which a container 100 may be constructed to provide lockable storage and transportation of four DRE voting machines. The DRE machines are each placed into corresponding carriers 102 and stacked generally horizontally within a lower portion 104 of container 100. In an upper portion 106 of container 100 another carrier 108 containing ancillary voting materials and supplies is inserted. A shelf 110 formed by extending a plurality of tubing sections 12 between opposing sidewalls of container 100 delineates the upper and lower portions 104, 106 respectively of the container. Door 28 is then closed and secured with a lock 32 or other securing means such as a locking cable, a cable tie, security seal or the like attached around a tubing section 12 of the door and an adjacent tubing section 12 of container 100, thereby securing carriers 102, 108 within the container.

Figure 10:
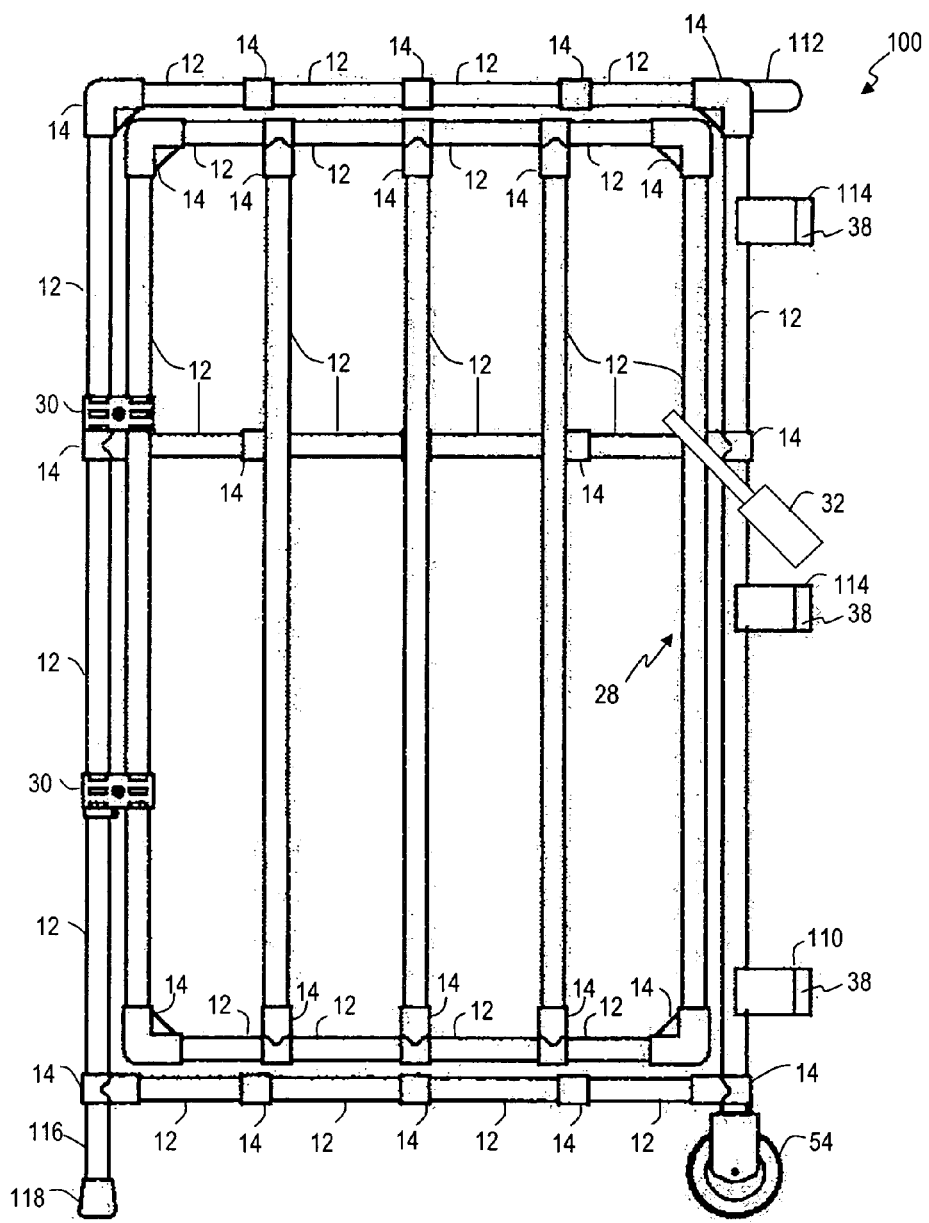
FIG. 10 is a left side elevational view of the container of FIG. 9.
Figure 11:
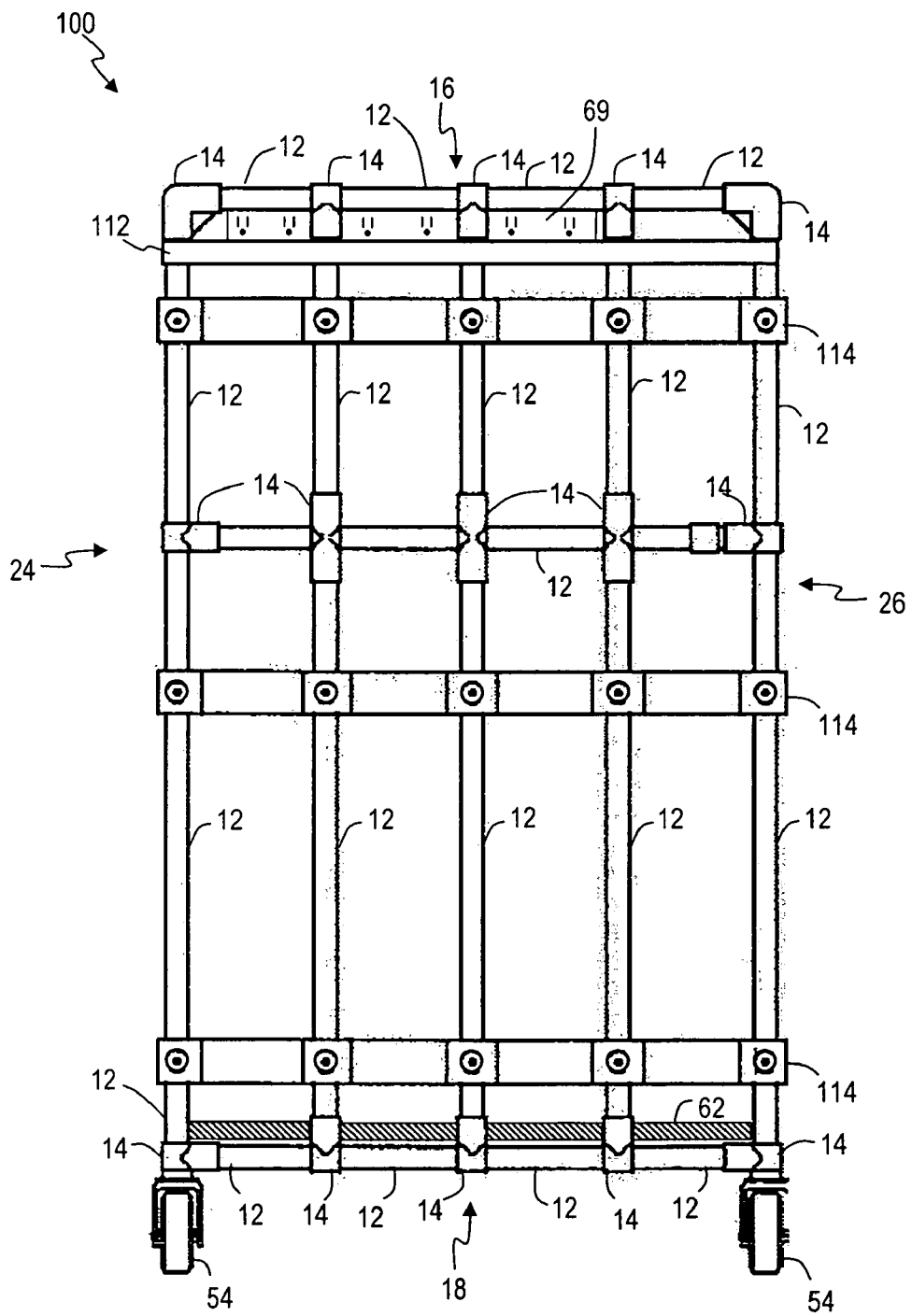
FIG. 11 is a rear elevational view of the container of FIG. 9.

As shown in FIGS. 9, 10 and 11, rear side 22 includes a pair of wheels 54 located at an edge of bottom 18. A handle 112 is formed by an additional tubing section 12 attached along the upper rear 22 edge of rear side 22 to provide the user with greater ease of movement of container 100. Handle 112 may alternatively be formed by the uppermost generally horizontal tubing section 12 of rear side 22. A plurality of runners 114 are also affixed to rear side 22. Front side 20 includes a pair of legs 116 at a lower edge. A plastic or rubber cap 118 may be fitted into or over an end of each leg 116 to prevent marring of floor surfaces under container 100 and to prevent inadvertent movement of the container when it is resting in a generally vertical position.

Container 100 may be transported by a single user by grasping handle 112 and pivoting the container about wheels 54 to tilt the container. In doing so legs 116 are raised away from a resting position against the floor, allowing container 100 to be rolled on wheels 54 in the general manner of a two-wheel cart or dolly. Wheels 54 may be of either a fixed or free-castering type.

Figure 14:
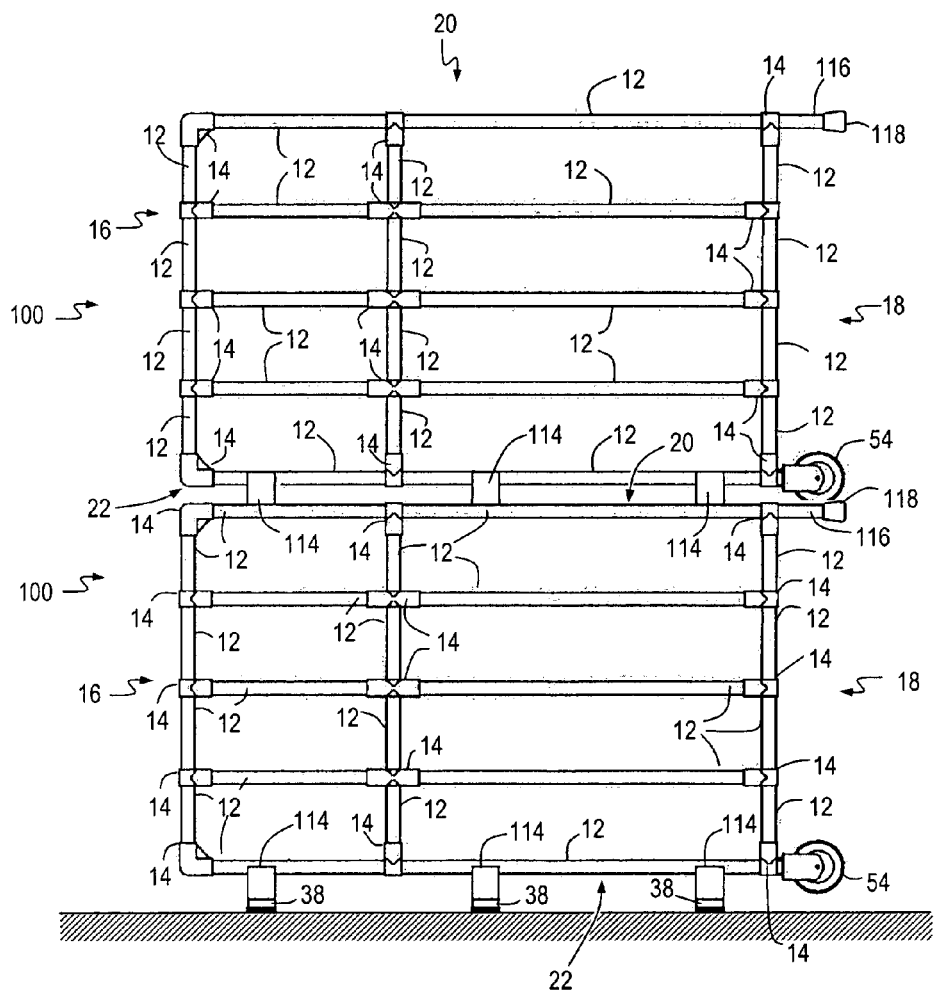
FIG. 14 is a right side elevational view of two of the containers of FIG. 9 depicting the two containers stacked in a generally horizontal position.
Figure 15A:
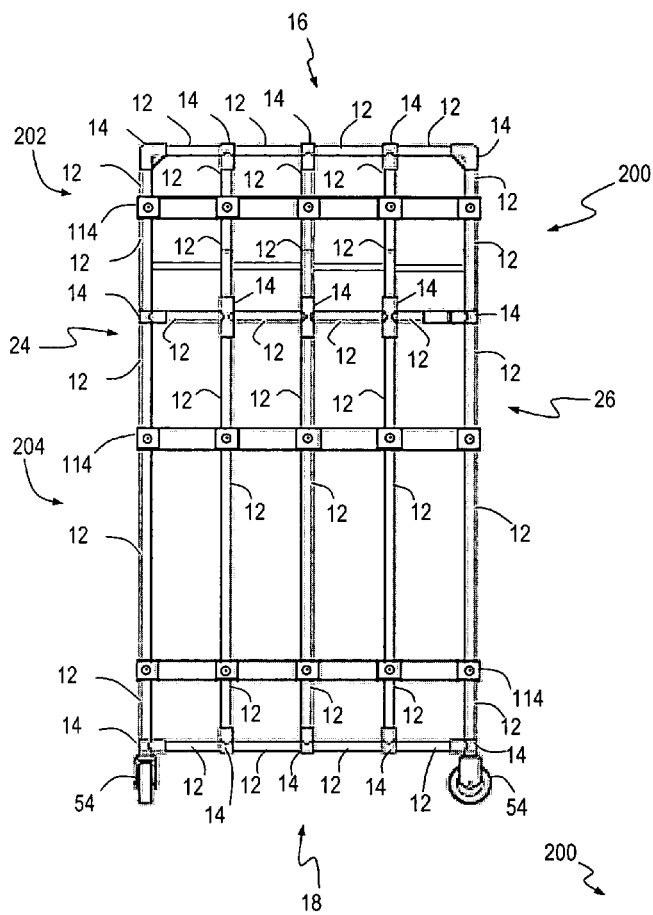
FIG. 15A is a rear elevational view of a container to yet another embodiment of the present invention.
Figure 15B:
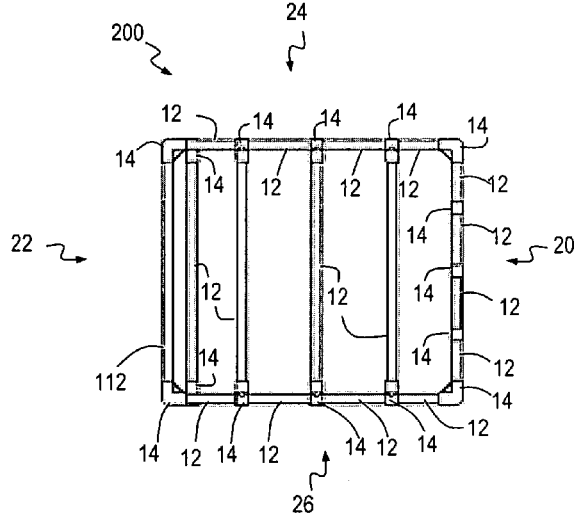
FIG. 15B is a top elevational view of the container of FIG. 15A.
Figure 15C:
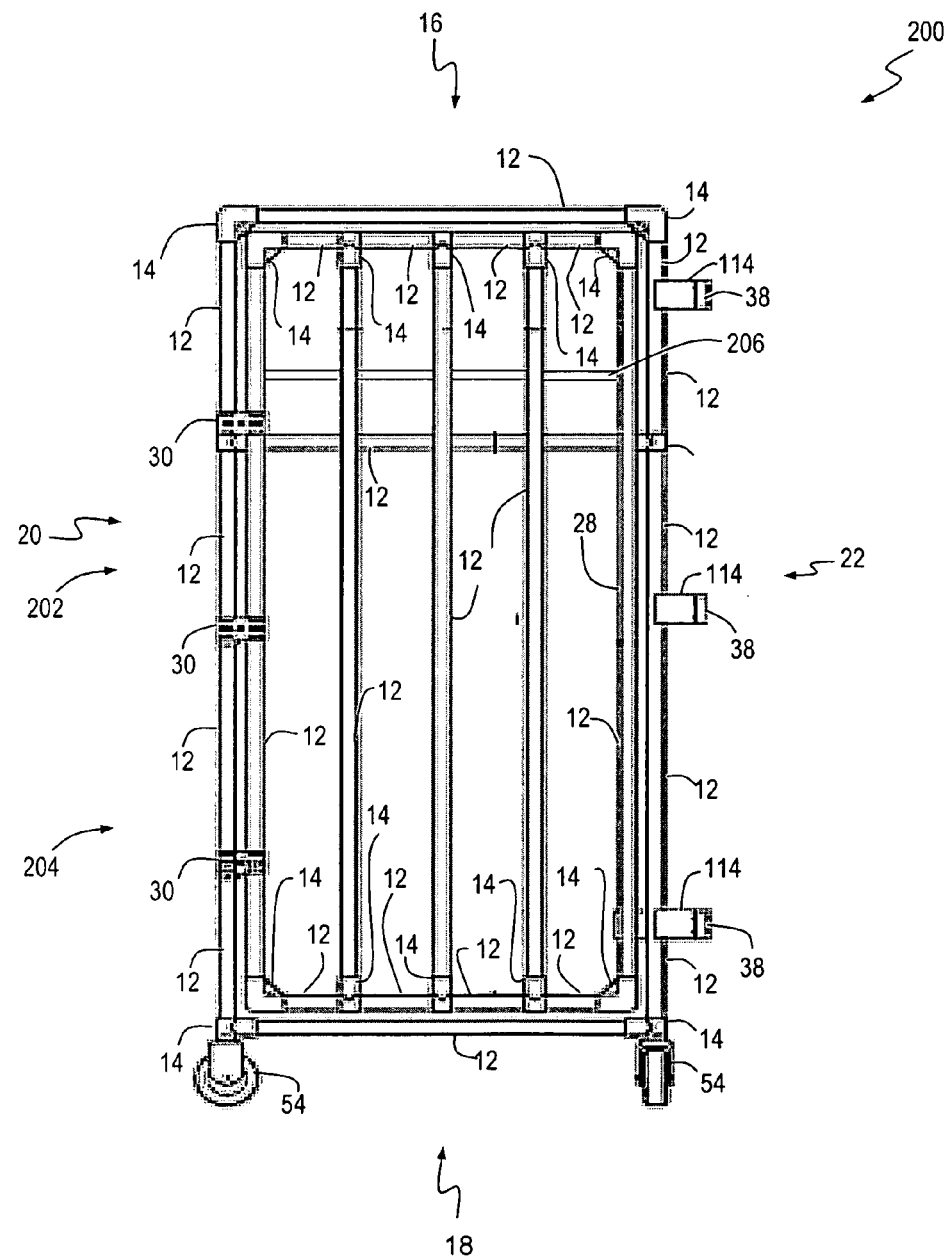
FIG. 15C is a left side elevational view of the container of FIG. 15A.

Container 100 may be stored in a generally vertical position wherein wheels 54 and legs 116 are resting against the floor, as shown in FIGS. 9 and 10. Alternatively, container 100 may be pivoted about wheels 54 such that the container is in a generally horizontal position with runners 134 resting against the ground, as shown in FIG. 14. In this orientation container 100 can be moved by a forklift by engaging the forklift tines between and generally parallel to runners 114 and lifting the container. A plurality of containers 100 may be stacked in the horizontal orientation as shown in FIG. 14, wherein notches 38 of the runners 114 of an upper container are positioned against adjacent tubing sections 12 of front side 20 of a lower container. When the containers 100 are stacked, doors 28 of the containers remain accessible so that equipment stored therein may be removed.

In one embodiment of the present invention an additional set of wheels similar to wheels 54 may be attached to legs 56 in place of caps 118, allowing container 100 to be transported while in a generally vertical position by rolling it on the four wheels. The wheels attached to legs 56 may be of either a fixed or free-castering type.

SECOND ALTERNATE EMBODIMENT

Referring now to FIGS. 15A-18, a container 200 is shown according to yet another embodiment of the present invention. Container 200 is configured to house an optical scan voting unit such as the Model 100 Precinct Ballot Counter produced by Elections Systems & Software. Such a unit may require an upper level 202 within container 200 to house the ballot counter and a lower level 204 in which to stack and store the counted ballots. A shelf 206 is provided by a plurality of tubing sections 12 extending between opposing sidewalls of container 200.

Container 200 is constructed for this application with four wheels thus allowing the container to be moved by a single user by pushing or pulling it in a desired direction. Container 200 may further be pivoted from a generally vertical position to a generally horizontal position to allow stacking of a plurality of containers in the manner previously described. A door 28 is provided along left side 24 of container 200 to allow access to the interior of the container. Ramp 44 is also provided for loading and unloading voting equipment 207 from container 200. A ramp 44 is hingedly attached along the edge of the bottom 18 of container 10 near the bottom of door 28.

In one instance, the spacing of tubing sections 12 may allow adequate access for voters to insert their paper ballots into the voting machine for reading without the need to remove the machine from container 200. Such a design may increase the security of the machine and its collected vote tallies by reducing the ability of others to tamper with the machine or the collected paper ballots. The spacing may further allow access to the machine for supplying electricity or other connections necessary for its use.

Figure 16C:
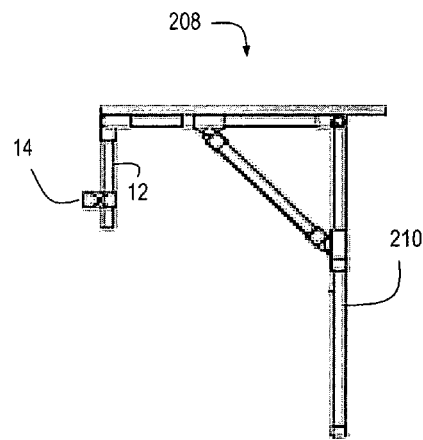
FIG. 16C is a rear elevation of a container of FIG. 11 with the table of FIG. 16A attached thereto.
Figure 16C:
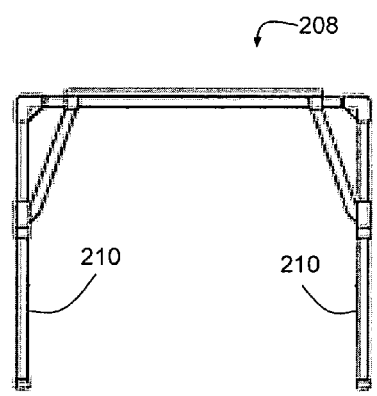
Figure 16C:
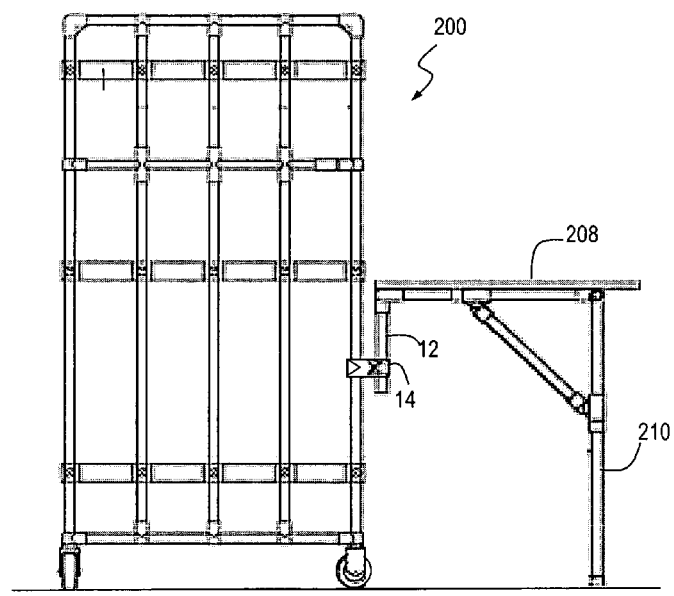

Container 200 may also provide a table 208, depicted in FIGS. 16A, 16B and 16C. Table 208 may be attached to the exterior of container 200 as depicted in FIG. 16C by connectors 14 or by another form of connector. Table 208 may be hingedly attached along a side 20, 22, 24 or 26 of container 200 such that it may be pivoted either upwardly or downwardly to a vertical position flat against the side of the container for storage or to a position generally perpendicular to the side of the container for use. Table 208 may be constructed of any suitable material including metal, plastic or wood, among others.

Features may be added between the table 208 and container 200 to assist in lifting or lowering the table and to hold it in the upright or lowered position such as springs, hydraulic cylinders and biasing mechanisms. Further, a set of legs 210 may be permanently hingedly or detachably attached to table 208 to support it when in the lowered position. Table 208 may provide a work surface upon which a voting machine may be placed during use and may be designed to comply with the Americans with Disabilities Act requirements for handicapped voting stations. In addition, if necessary container 200 may be counterweighted to ensure that the weight of items placed on table 208 do not cause the container to tip over.

Figure 17:
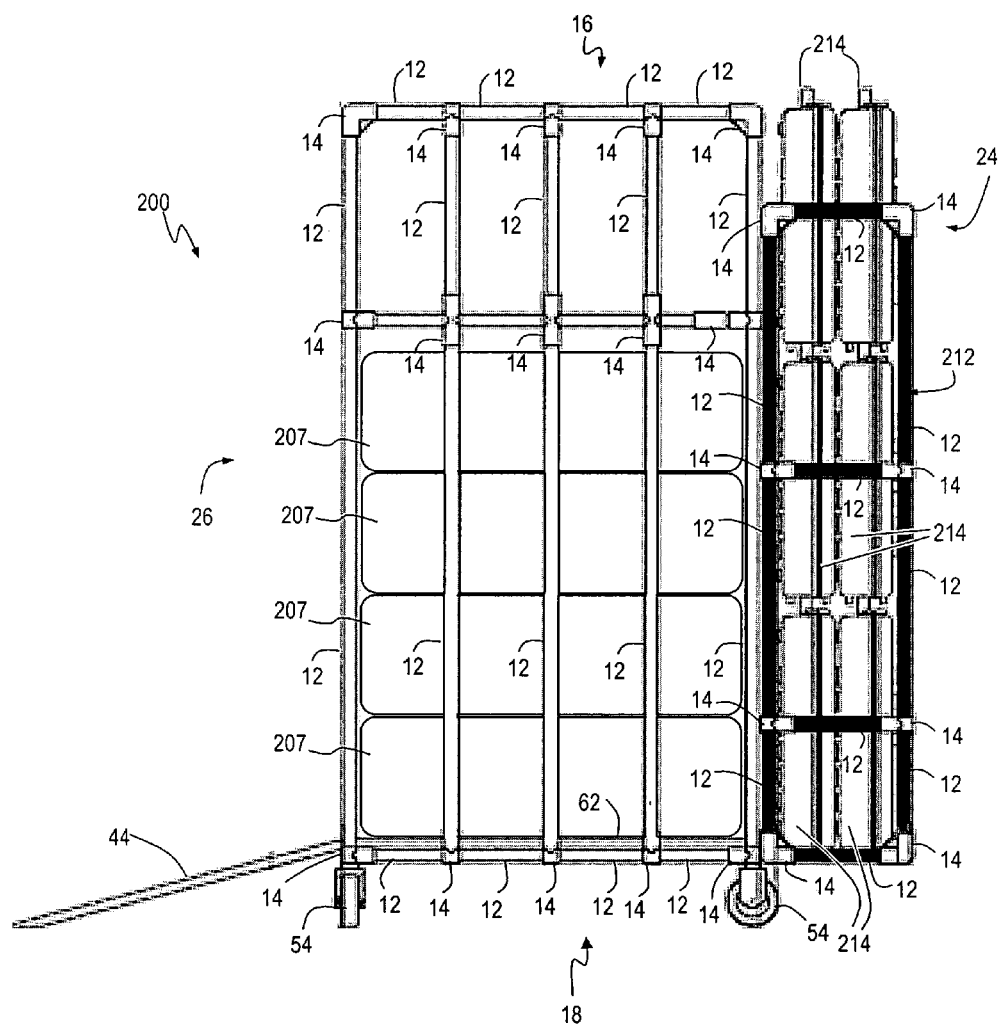
FIG. 17 is a front elevational view of an optional storage case for a container according to an embodiment of the present invention.
Figure 18:
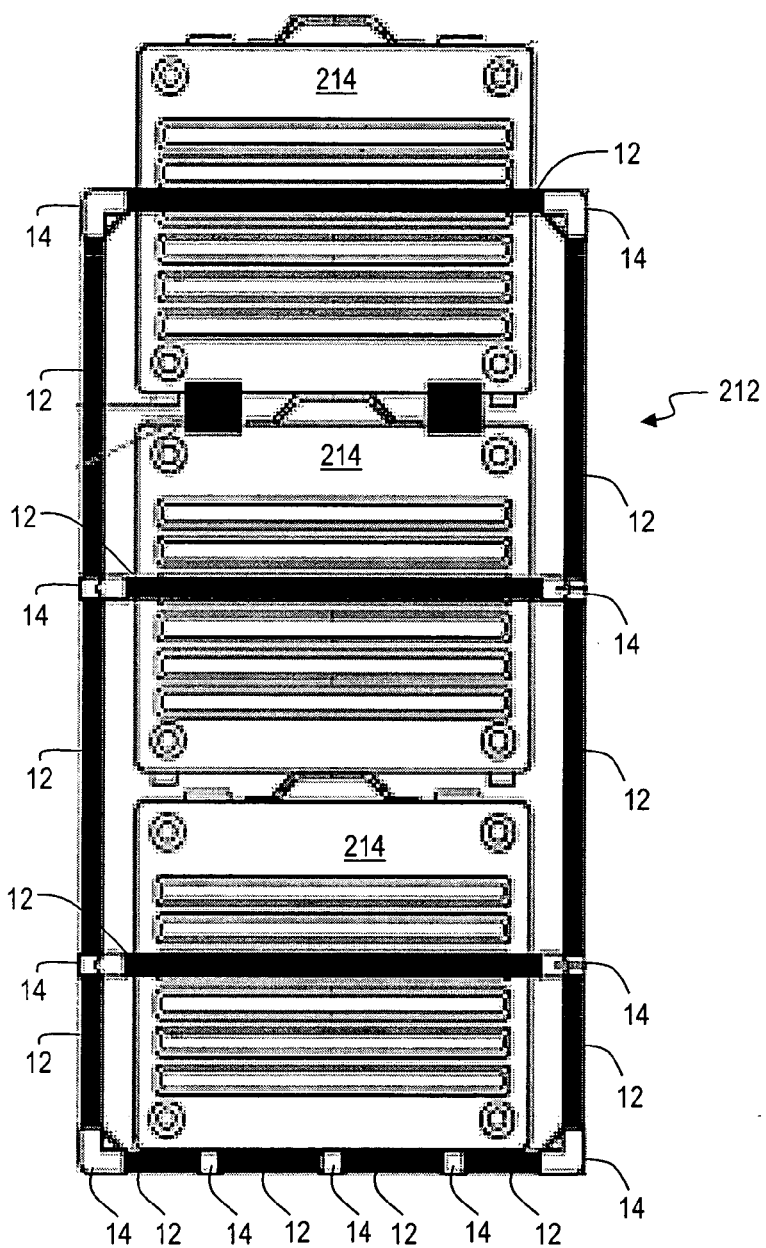
FIG. 18 is an elevational view of the storage case of FIG. 17 with three visible voting machine carriers stacked within.

A storage cage 212 may also be optionally attached to container 200 as depicted in FIGS. 17 and 18. Storage cage 212 may be constructed from the same materials and procedures as container 200 and may be permanently or detachably attached to a side 20, 22, 24, 26 or top 16 of the container. Storage cage 212 may also be designed to allow lockability but generally such is not required. Generally, non-secure items 214 may be placed into the carrying cage such as voting booths or folding chairs to be used with voting equipment 207 stored securely within container 200.

It should be noted that containers 10, 100 and 200 of the present invention may be adapted for storing, securing and transporting any desirable number of voting units and associated items. It should also be noted that containers 10, 100 and 200 are not limited to storing, securing and transporting voting equipment. As previously noted, the size and shape of containers 10, 100 and 200 may be varied. Accordingly, containers 10, 100 and 200 may be used to store, secure and transport any article or articles placed therein.

While this invention has been shown and described with respect to a detailed embodiment thereof, it will be understood by those skilled in the art that changes in form and detail thereof may be made without departing from the scope of the claims of the invention.

What is claimed is:

1. A container for storing, securing and transporting articles, comprising:
a plurality of members having predetermined lengths;
a plurality of connectors interconnecting the members to space apart and arrange the members generally vertically and horizontally to form a boxlike shape, the connectors comprising a plurality of open, hollow ends into which the members are inserted and fixedly retained;
a selectably securable closure hingedly coupled to a first sidewall of the container;
a pair of wheels attached to a first edge of a bottom of the container; and
a first pair of legs attached to a second, opposing edge of the bottom of the container,
wherein the container is configured to receive one or more articles through the closure for storage,
wherein the container is configurable for storage in both a generally vertical orientation, resting upon the wheels and legs, and a generally horizontal orientation,
wherein the container is pivotable about the wheels to transport the container, and
wherein the container is configured to be stacked upon like containers when in the horizontal orientation.

2. The container of claim 1, further comprising a plurality of runners attached to a second sidewall of the container.

3. The container of claim 2 wherein the runners are configured to facilitate insertion of forklift tines between the runners and the container to lift and transport the container with a forklift.

4. The container of claim 1 wherein the members are tubing sections.

5. The container of claim 1 wherein the closure is constructed from a plurality of members having predetermined lengths and a plurality of connectors to form a generally planar door.

6. The container of claim 5 wherein the closure further includes one of a latch, clamp, lock, deadbolt, cable tie, tamper-resistant seal, tapes, fasteners, cables and chains to secure the closure.

7. The container of claim 1 wherein the closure comprises a plurality of sections hinged to a common edge of the container.

8. The container of claim 1, further comprising at least one stowable ramp proximate the closure to facilitate loading and unloading of articles into and from the container.

9. The container of claim 1, further comprising at least one divider.

10. The container of claim 1, further comprising an accessory box.

11. The container of claim 1, further comprising a deck.

12. The container of claim 1, further comprising an exterior cover to generally enclose the container.

13. The container of claim 1, further comprising a nameplate displaying information corresponding to the articles stored in the container.

14. The container of claim 1, further comprising an electrical power outlet.

15. The container of claim 1, further comprising at least one data port configured to facilitate transfer of data to and from articles stored within the container.

16. The container of claim 1, further comprising at least one of GPS equipment and RFID tags to facilitate inventory and tracking of at least one of the container and articles stored therein.

17. The container of claim 1 wherein the members are finished in at least one predetermined color by one of molding, plating and painting.

18. The container of claim 1 wherein the pair of legs comprise a second pair of wheels.

19. The container of claim 1 wherein the articles comprise voting equipment.

20. The container of claim 1, further comprising a table detachably coupled to a sidewall of the container.

21. The container of claim 1, further comprising a storage cage attached to the container.

* * * * *